March 15, 1932.    E. L. H. CURRAN    1,849,910
BRAKE TESTER
Filed May 5, 1930
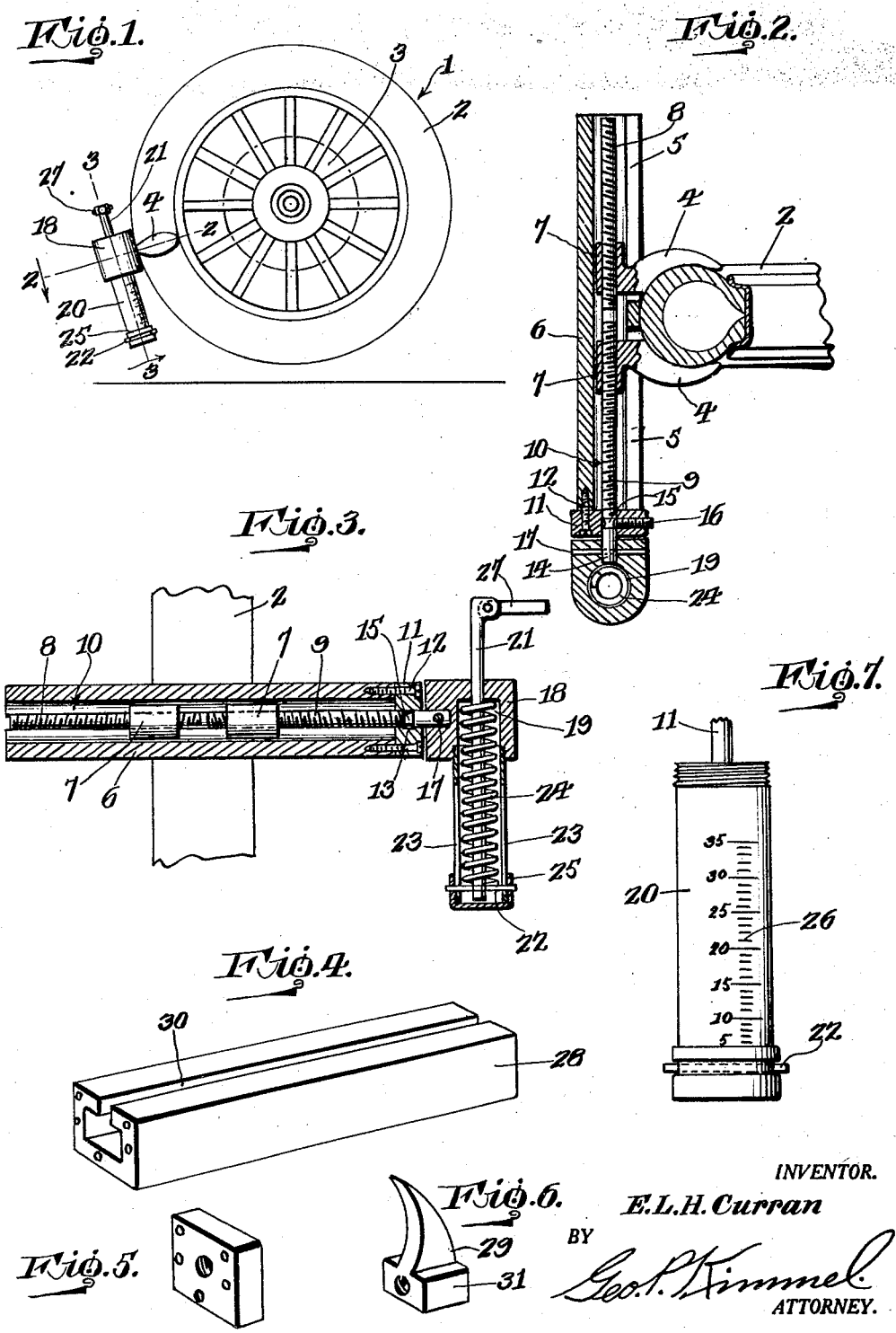
INVENTOR.
E. L. H. Curran
BY
Geo. S. Kimmel
ATTORNEY.

Patented Mar. 15, 1932

1,849,910

UNITED STATES PATENT OFFICE

EUGENIE L. H. CURRAN, OF PORTLAND, OREGON

BRAKE TESTER

Application filed May 5, 1930. Serial No. 449,988.

This invention relates to a brake tester and has for its primary object to provide, in a manner as hereinafter set forth, a device for successive application to the brake carrying wheels of a motor vehicle to determine the pressure required to turn each wheel against the action of its brake, thereby enabling the brakes to be accurately adjusted for even operation and maximum efficiency.

A further object of the invention is to provide a brake tester as aforesaid which includes a pair of reciprocable tire clamps mounted on a common screw, and which further includes a spring resisted, slidable rod for coaction with a scale to indicate the pressure necessary to turn the wheel upon which the test is being made.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the several views:—

Figure 1 is an elevation of a vehicle wheel showing an embodiment of my invention in association therewith.

Figure 2 is an enlarged section taken on the line 2—2 of Figure 1.

Figure 3 is an enlarged section taken on the line 3—3 of Figure 1.

Figure 4 is a perspective view of a modified form of support for the tire clamps.

Figure 5 is a perspective view of a closure block for one end of the support shown in Figure 4.

Figure 6 is a perspective view of one of the clamps used in connection with the support shown in Figure 4.

Figure 7 is an elevation of the casing for the pressure indicator.

Referring to the drawings in detail, the numeral 1 indicates generally a vehicle wheel including a tire 2 and a brake 3. Adapted to engage the tire 2 on opposite sides thereof are a pair of oppositely disposed, arcuate clamps 4 which extend through longitudinally aligned slots 5 in a cylindrical supporting member 6, and which are formed with cylindrical bases 7 disposed within the supporting member 6. The bases 7 are internally threaded and are mounted on right and left hand threaded portions 8 and 9 respectively of a screw 10 disposed within the supporting member 6. The supporting member 6 is provided at one end with a closure block 11 which is secured in position by means of a plurality of holdfast devices 12. The block 11 is formed with a centrally disposed opening 13 through which the screw 10 rotatably extends, the screw 10 having a smooth face portion 14 projecting from the outer face of the block 11. The inner end of the smooth face portion 14 is provided with a circumferentially extending groove 15 for engagement by a set screw 16 carried by the block 11 to prevent longitudinal movement of the screw relative to the supporting member when the screw is rotated.

Secured to the end portion 14 of the screw, by means of a suitable pin 17, is a head block 18 which is formed with a socket 19 extending at a right angle to the plane of the screw 10. The outer end portion of the socket 19 is internally threaded and has secured therein the externally threaded open end of a cylindrical casing 20 having its opposite end closed. Extending through the bottom wall of the socket 19 and into the casing 20 is a slidable rod 21, which is provided adjacent its inner end with a cross pin 22, the ends of which project through longitudinally extending, diametrically opposed slots 23 formed in the casing 20. Encircling the rod 21 is a coiled spring 24, the respective ends of which abut against the cross pin 22 and the bottom wall of the socket 19. Encircling the casing 20 and seating on end portions of the cross pin 22 is an annulus 25 which is adapted to be moved across the calibrated outer face 26 of the casing. The rod 21 is provided at its outer end with a handle member 27.

When applying the brake tester to a wheel, the latter is jacked up as shown in Figure 1, and the supporting member 6 is placed transversely of the tire 2 with the clamps 4 disposed on opposite sides of the tire. The head block 18 is then rotated by means of the rod 21 which causes a rotation of the screw 10, and owing to the right and left hand threads of the screw in engagement with the bases 7 of the clamps 4, the latter will be moved toward each other to firmly grip the tire on opposite sides thereof. With the clamps firmly gripping the tire, an outward pull is exerted on the rod 21 against the tension of the spring 24 until the wheel is turned against the gripping action of its brake which is set thereagainst. Prior to the turning of the wheel, the rod 21 will be moved longitudinally of the casing 20 whereby the annulus 25 will be drawn across the calibrations 26 on the outer face of the casing. Upon the turning of the wheel the rod 21 is released and the cross pin 22 will be returned to its position adjacent the closed end of the casing by the action of the spring 24. The position of the annulus 25 may then be read in connection with the calibrations 26 to determine the amount of pressure which was required to turn the wheel against its brake.

If desired a supporting member such as 28 shown in Figure 4 may be substituted for the supporting member 6, and a pair of clamps such as 29 shown in Figure 6 substituted for the clamps 4. The supporting member 28 is of hollow construction rectangular in cross section and is formed in one wall with a slot 30 extending throughout its entire length. Each of the clamps 29 is formed with a base 31 of rectangular formation which fits within the hollow interior of the supporting member 28. Owing to the rectangular formation of the bases 31 and the hollow interior of the supporting member 28, the pressure on the supporting member during the turning of the wheel is distributed over an entire side wall of the supporting member whereby a minimum of pressure is concentrated on a side wall of the slot 30.

It is thought that the many advantages of a brake tester in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:

1. A brake tester comprising, a hollow supporting member adapted to be placed transversely of a vehicle wheel tire, said member having a longitudinal slot, a pair of oppositely disposed clamps on opposite sides of the tire, said clamps having internally threaded bases disposed within the supporting member and being movable longitudinally of the latter, a screw having right and left hand threaded portions respectively engaging the threaded bases of the clamps, a rotatable head block fixedly secured to one end of the screw, a casing carried by the head block and extending at a right angle to the longitudinal plane of the screw, said casing having a calibrated outer face, a spring resisted, slidable rod extending through the head block and into the casing, an indicating element for coaction with the calibrated face of the casing, and means operatively connecting said indicating element to said rod.

2. A brake tester comprising, a hollow supporting member adapted to be placed transversely of a vehicle wheel tire, said member having a longitudinal slot, a pair of oppositely disposed clamps on opposite sides of the tire, said clamps having internally threaded bases disposed within the supporting member and being movable longitudinally of the latter, a screw having right and left hand threaded portions respectively engaging the threaded bases of the clamps, a rotatable head block fixedly secured to one end of the screw, a casing carried by the head block and extending at a right angle to the longitudinal plane of the screw, said casing having a calibrated outer face, a spring resisted, slidable rod extending through the head block and into the casing, an indicating element for coaction with the calibrated face of the casing, and means operatively connecting said indicating element to said rod, said clamps being of arcuate formation.

3. A brake tester comprising, a hollow supporting member adapted to be placed transversely of a vehicle wheel tire, said member having a longitudinal slot, a pair of oppositely disposed clamps on opposite sides of the tire, said clamps having internally threaded bases disposed within the supporting member and being movable longitudinally of the latter, a screw having right and left hand threaded portions respectively engaging the threaded bases of the clamps, a rotatable head block fixedly secured to one end of the screw, a casing carried by the head block and extending at a right angle to the longitudinal plane of the screw, said casing having a calibrated outer face, a spring resisted, slidable rod extending through the head block and into the casing, and an indicating element for coaction with the calibrated face of the casing, said indicating element being operatively connected with said rod to move therewith, said casing having a pair of longitudinally extending, diametrically opposed slots, said rod having a cross pin extending through said slots, said indicating element encircling said casing and seating on said cross pin.

4. A brake tester comprising, a hollow supporting member adapted to be placed transversely of a vehicle wheel tire, said member having a longitudinal slot, a pair of oppositely disposed clamps on opposite sides of the tire, said clamps having internally threaded bases disposed within the supporting member and being movable longitudinally of the latter, a screw having right and left hand threaded portions respectively engaging the threaded bases of the clamps, a rotatable head block fixedly secured to one end of the screw, a casing carried by the head block and extending at a right angle to the longitudinal plane of the screw, said casing having a calibrated outer face, a spring resisted, slidable rod extending through the head block and into the casing, an indicating element for coaction with the calibrated face of the casing, and means operatively connecting said indicating element to said rod, said casing having an externally threaded open end, said head block being formed with a socket having a threaded wall portion engaging the externally threaded end of the casing.

5. A brake tester comprising, a hollow supporting member adapted to be placed transversely of a vehicle wheel tire, said member having a longitudinal slot, a pair of oppositely disposed, arcuate clamps on opposite sides of the tire, said clamps having internally threaded bases disposed within the supporting member and being movable longitudinally of the latter, a screw having right and left hand threaded portions respectively engaging the threaded bases of the clamps, a closure block fixedly secured to one end of the supporting member and having a centrally disposed opening, said screw having a smooth faced end portion extending through the opening in the closure block, a rotatable head block fixedly secured to the smooth faced end portion of the screw, a casing carried by the head block and extending at a right angle to the longitudinal plane of the screw, said casing having a calibrated outer face, a spring resisted, slidable rod extending through the head block and into the casing, an indicating element for coaction with the calibrated face of the casing, and means operatively connecting said indicating element to said rod.

6. A brake tester comprising, a hollow supporting member adapted to be placed transversely of a vehicle wheel tire, said member having a longitudinal slot, a pair of oppositely disposed, arcuate clamps on opposite sides of the tire, said clamps having internally threaded bases disposed within the supporting member and being movable longitudinally of the latter, a screw having right and left hand threaded portions respectively engaging the threaded bases of the clamps, a closure block fixedly secured to one end of the supporting member and having a centrally disposed opening, said screw having a smooth faced end portion extending through the opening in the closure block, a rotatable head block fixedly secured to the smooth faced end portion of the screw, a casing carried by the head block and extending at a right angle to the longitudinal plane of the screw, said casing having a calibrated outer face, a spring resisted, slidable rod extending through the head block and into the casing, an indicating element for coaction with the calibrated face of the casing, and means operatively connecting said indicating element to said rod, said smooth faced end portion of the screw being provided with a circumferentially extending groove, said closure block having a set screw engaging the walls of said groove to prevent longitudinal movement of the screw relative to the supporting member when the screw is rotated.

7. A brake tester comprising, a hollow supporting member adapted to be placed transversely of a vehicle wheel tire, said member having a longitudinal slot, a pair of oppositely disposed clamps on opposite sides of the tire, said clamps having internally threaded bases disposed within the supporting member and being movable longitudinally of the latter, a screw having right and left hand threaded portions respectively engaging the threaded bases of the clamps, a casing extending transversely of the longitudinal plane of the screw, means rigidly connecting the casing with the screw, said casing having a calibrated outer face, a slidable rod extending into the casing, means yieldably resisting movement of the rod longitudinally of the casing, an indicating element for coaction with the calibrated face of the casing, and means operatively connecting said indicating element to said rod.

In testimony whereof, I affix my signature hereto.

EUGENIE L. H. CURRAN.